Nov. 29, 1966   F. J. COLVILLE   3,288,374
FLUID FLOW CONTROL APPARATUS
Filed April 8, 1965   3 Sheets-Sheet 1
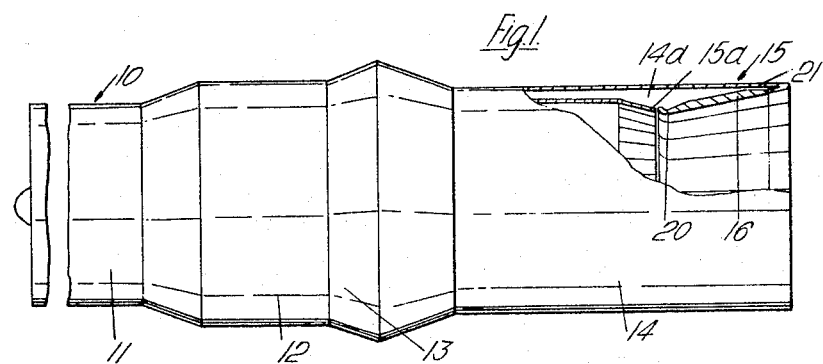
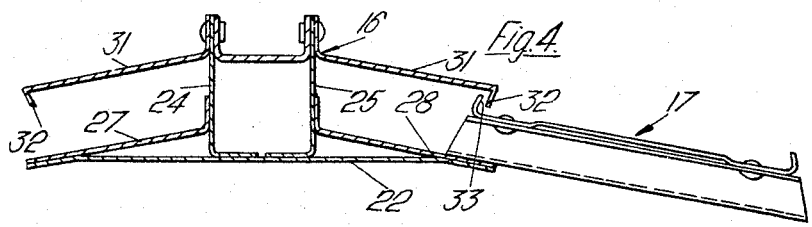
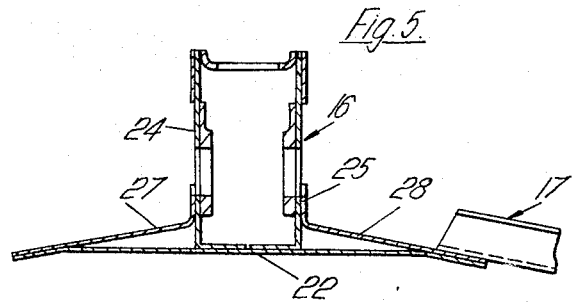
Inventor
Francis Jeffrey Colville
By
Cushman, Darby & Cushman
Attorneys

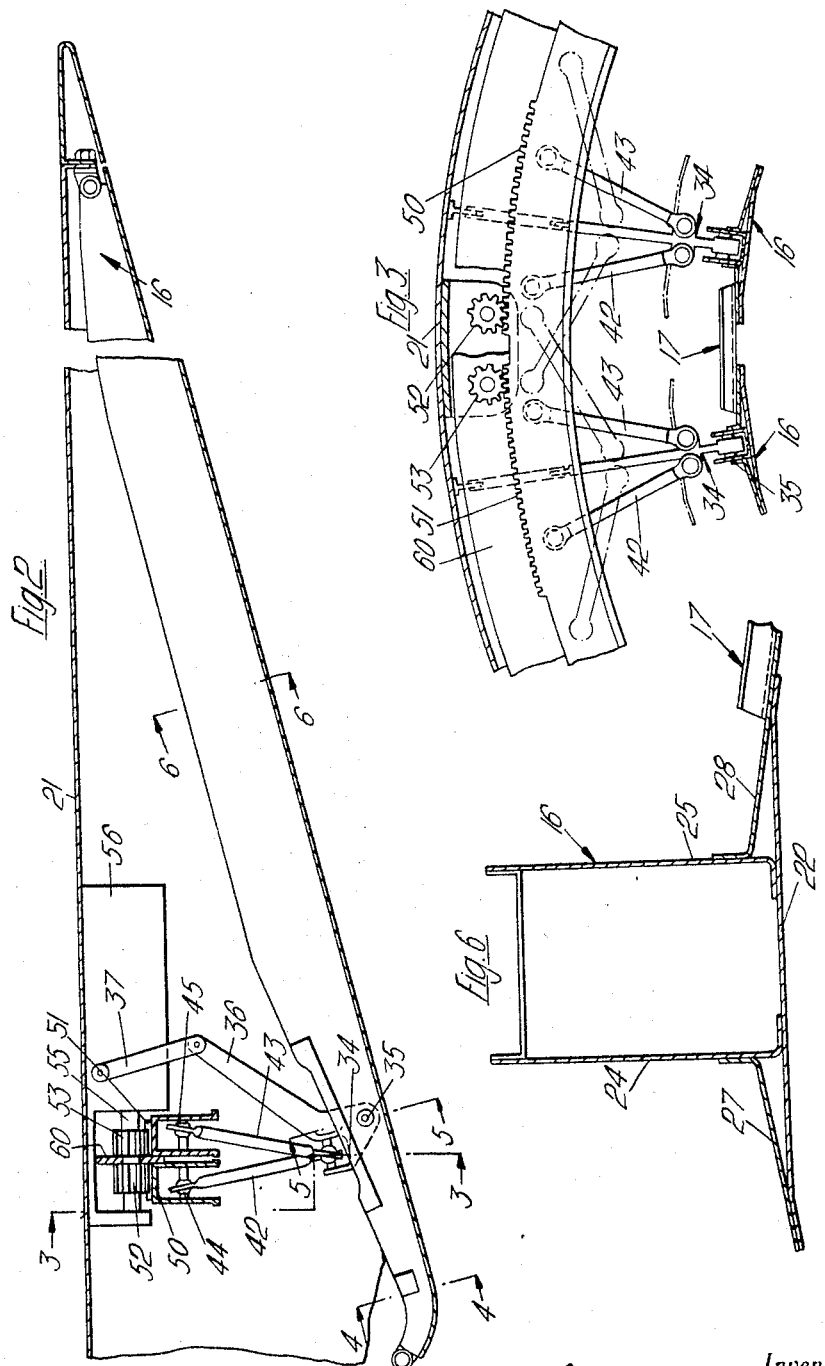

Nov. 29, 1966   F. J. COLVILLE   3,288,374
FLUID FLOW CONTROL APPARATUS
Filed April 8, 1965   3 Sheets-Sheet 3
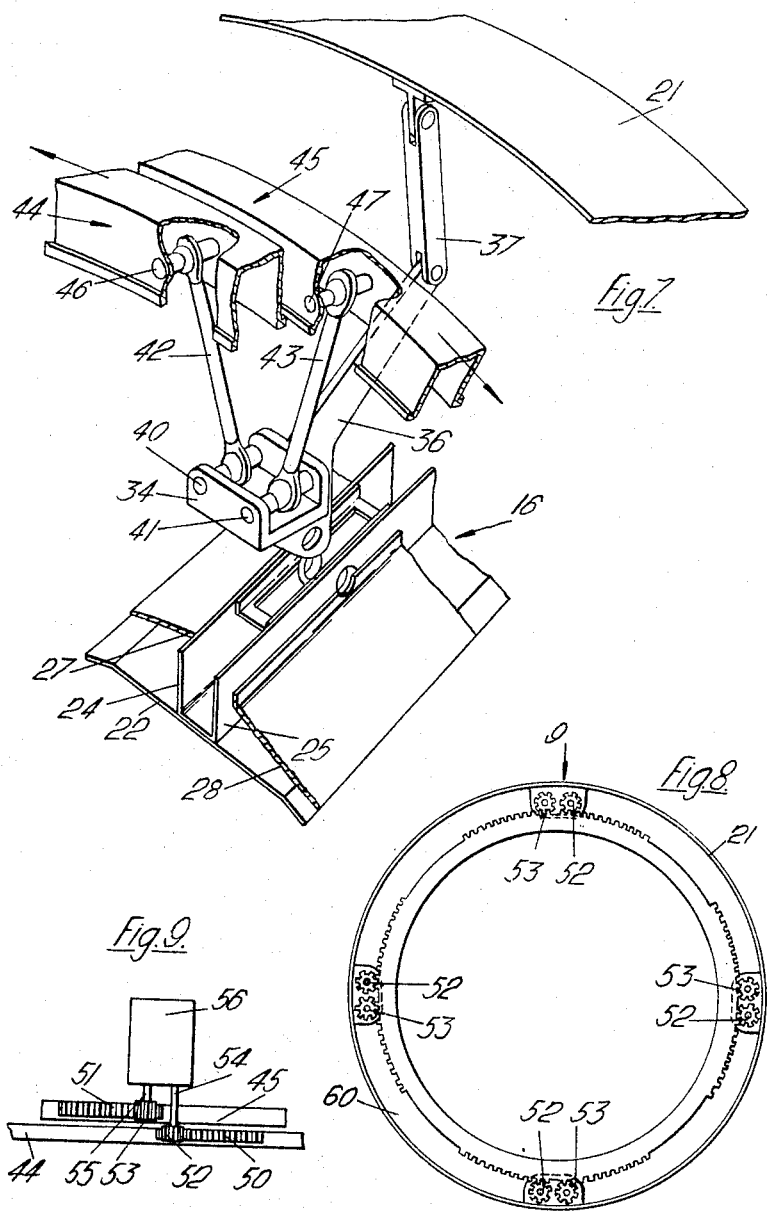

United States Patent Office 3,288,374
Patented Nov. 29, 1966

3,288,374
FLUID FLOW CONTROL APPARATUS
Francis J. Colville, Sutton-in-Ashfield, England, assignor to Rolls-Royce Limited, Derby, England, a British company
Filed Apr. 8, 1965, Ser. No. 446,676
Claims priority, application Great Britain, Apr. 24, 1964, 17,164/64
7 Claims. (Cl. 239—265.41)

This invention concerns fluid flow control apparatus and, although it is not so restricted, it is more particularly concerned with a jet engine nozzle.

According to the invention in its broadest aspect, there is provided fluid flow control apparatus comprising a fluid conduit the flow through which is controlled by at least one flap which is pivoted to fixed structure, a pair of similar, adjacent, concentric, annular or part-annular, rotatable members for the or each said flap or group of flaps, two similar links for the or each said flap which are pivotally connected to their flap at a point or points remote from the said fixed structure and which are respectively pivotally connected to their two different rotatable members, and means for simultaneously rotating the two rotatable members of the or each said pair in opposite angular senses to effect pivotal movement of said flap or flaps, whereby to alter the flow through said fluid conduit.

In its preferred form, the invention comprises a jet engine nozzle comprising a nozzle casing within which are disposed an annular assembly of angularly spaced apart flaps each of which is pivotally connected at its rearward or upstream end to the nozzle casing, at least one pair of similar, adjacent, concentric annular or part-annular rotatable members which are mounted so as to be faced by the radially outer faces of the flaps, at least some of the flaps having two similar links which are pivotally connected to their flap at a point or points remote from the nozzle casing and which are respectively pivotally connected to the two different rotatable members of the or a said pair, and means for simultaneously rotating the rotatable members of the or each said pair in opposite angular senses to effect simultaneous pivotal movement of all the flaps, whereby selectively to reduce and increase the cross-sectional area at the throat of the nozzle.

The rotatable members of the or each said pair are preferably formed with gear teeth which mesh respectively with at least one pair of gears which are arranged to be driven angular senses. Thus, the or each pair of gears may be driven by common motor.

Preferably alternate flaps are provided with two said links, the remaining flaps being contacted by the said alternate flaps so as to be moved thereby.

Preferably two fully annular rotatable members only are provided which are rotated by a plurality of angularly spaced apart motors.

The invention also comprises a jet engine provided with a nozzle as set forth above.

The invention is illustrated, merely by way of example in the accompanying drawings, in which:

FIGURE 1 is a diagrammatic view, partly in section, of a gas turbine jet engine provided with a nozzle according to the present invention, FIGURE 2 is a broken-away sectional view showing part of the nozzle of FIGURE 1, FIGURES 3, 4, 5 and 6 are sectional views taken respectively on the lines 3—3, 4—4, 5—5 and 6—6 of FIGURE 2, FIGURE 7 is an exploded broken-away perspective view of part of the nozzle shown in FIGURE 1, FIGURE 8 is a diagrammatic cross-section through the nozzle of FIGURE 1, and FIGURE 9 is a diagrammatic view looking in the direction of the arrow 9 of FIGURE 8.

Referring to the drawings, a gas turbine jet engine 10 comprises in flow series one or more compressors 11, combustion equipment 12, one or more turbines 13, a jet pipe 14 and a bleed air or by-pass air duct 14a which surrounds the jet pipe 14. Mounted at the downstream end of the jet pipe 14 is a variable area convergent/divergent nozzle 15 formed by an annular assembly of flaps 15a which form the convergent portion of the nozzle and an annular assembly of angularly spaced, alternately arranged flaps 16, 17 (see FIGURES 3, 4 and 5), which form the divergent portion of the nozzle. The duct 14a feeds by-pass or bleed air to the axial gap formed between the convergent nozzle portion and the divergent nozzle portion where it passes into the exhaust gas stream.

The divergent portion of the nozzle 15 has a nozzle casing 21 within which the flaps 16, 17 are disposed, each of the flaps 16, 17 being pivotally connected at its downstream end to the nozzle casing 21. The flaps 16, 17 may thus be pivotally moved so as to reduce and increase the cross sectional area at the throat 20 of the nozzle 15.

Each of the flaps 16 is of channel section having a base 22 which extends outwardly of side walls 24, 25. The base 22 is braced by plates 27, 28 which extend respectively to the side walls 24, 25 and form a seating on which the flaps 17 may slide.

Each of the flaps 16 is formed at tis upstream end with plates 31, plates 31 having radially inwardly directed flanges 32 at their outer ends.

Each of the flaps 17 is supported, at its opposite sides, on the plates 27, 28 of the adjacent flaps 16. Each of the flaps 17 is provided at its upstream end with lugs 33 which are engageable with the flanges 32 to prevent displacement circumferentially of the flaps 17.

It will thus be appreciated that as the flaps 16 are moved radially inwardly and outwardly, the flaps 17 will be moved in a similar manner by virtue of their contact with the flaps 16.

Mounted between the side walls 24, 25 of each flap 16 and disposed away from the casing 21 is a bracket 34 (see FIGS. 2, 3 and 7), which is mounted on a pivot 35 mounted between the side walls 24, 25. The bracket 34 is carried by an arm 36 which is pivotally connected, at its end remote from the bracket 34 to a link 37. The link 37 is itself pivotally connected to the nozzle casing 21.

The bracket 34 is provided with pivots 40, 41 (FIG. 7) on which are respectively mounted two similar links 42, 43.

Two similar, adjacent, concentric, fully annular rotatable members 44, 45, which are of inverted U-section, are mounted adjacent the upstream ends of the flaps 16 and are faced by the radially outer faces of the flaps 16. The ends of the links 42, 43 remote from the bracket 34 are mounted on pivots 46, 47 extending between the side walls of the rotatable members 44, 45 respectively.

Thus since each flap 16 is connected by its links 42, 43, to the two different rotatable members 44, 45, it will be appreciated that, if these rotatable members are rotated in opposite angular senses, the flaps 16 will be moved radially inwardly or outwardly, according to the direction of rotation of the rotatable members 44, 45.

The rotatable members 44, 45 are respectively provided with four angularly spaced apart sets of gear teeth 50, 51 (FIGS. 3 and 9) which respectively mesh with gears 52, 53. The gears 52, 53 are respectively mounted on shafts 54, 55, each pair of shafts 54, 55, being driven by a common motor 56 in opposite angular senses. As will be seen from FIGURE 8, there are four such pairs of gears 52, 53, and thus four such motors 56.

Each pair of shafts 54, 55 extends through an annular locating plate 60 (see FIGURE 2) which is disposed between the adjacent side walls of the rotatable members 44, 45 and thereby positions rotatable members 44, 45 axially within the nozzle casing.

As is clearly shown in FIGURE 3, when the rotatable members 44, 45 are rotated in opposite angular senses so as to move the links 42, 43 from their full line to their dotted line positions, or vice versa, the brackets 34 move along straight radial lines. There is thus no circumferential stress placed on the flaps 16.

It will be noted that the rotatable members 44, 45 are not provided with bearings since they are held in position by the structure to which they are connected and remain in equilibrium whilst containing within themselves all loads resulting from nozzle actuation.

I claim:

1. Fluid flow control apparatus comprising fixed structure, a fluid conduit extending therethrough, at least one flap which is pivoted up the fixed structure and which controls flow through the fluid conduit, a pair of similar, adjacent, concentric, annular rotatable members for each said flap, two similar links for each said flap which are pivotally connected to their flap at at least one point remote from the said fixed structure and which are respectively pivotally connected to their two different rotatable members, and means for simultaneously rotating the two rotatable members of each said pair thereof in opposite angular senses to effect pivotal movement of the respective flap, whereby to alter the flow through said fluid conduit.

2. A jet engine nozzle comprising a nozzle casing, an annular assembly of angularly spaced apart flaps, disposed within the nozzle casing, each flap being pivotally connected at its upstream end to the nozzle casing, at least one pair of similar, adjacent, concentric annular rotatable members which are faced by the radially outer faces of the flaps, pairs of similar links for at least some of the flaps, the links of each pair being pivotally connected to their flap at at least one point remote from the nozzle casing and being respectively pivotally connected to the two different rotatable members of a said pair thereof, and means for simultaneously rotating the rotatable members of each said pair in opposite angular senses to effect simultaneous pivotal movement of all the flaps, whereby selectively to reduce and increase the cross sectional area at the throat of the nozzle.

3. A jet engine nozzle comprising a nozzle casing, an annular assembly of angularly spaced apart flaps disposed within the nozzle casing, each flap being pivotally connected at its upstream end to the nozzle casing, at least one pair of similar, adjacent, concentric annular rotatable members which are faced by the radially outer faces of the flaps, pairs of similar links for at least some of the flaps, the links of each pair being pivotally connected to their flap at at least one point remote from the nozzle casing and being respectively pivotally connected to the two different rotatable members of a said pair thereof, the rotatable members of each said pair thereof being formed with gear teeth, and at least one pair of gears which mesh with said gear teeth and which are arranged to be driven in oppositely angular senses, to effect simultaneous pivotal movement of all the flaps, whereby selectively to reduce and increase the cross sectional area at the throat of the nozzle.

4. A jet engine nozzle comprising a nozzle casing, an annular assembly of angularly spaced apart flaps disposed within the nozzle casing, each flap being pivotally connected at its upstream end to the nozzle casing, at least one pair of similar, adjacent, concentric annular rotatable members which are faced by the radially outer faces of the flaps, pairs of similar links for at least some of the flaps, the links of each pair being pivotally connected to their flap at at least one point remote from the nozzle casing and being respectively pivotally connected to the two different rotatable members of a said pair thereof, the rotatable members of each said pair thereof being formed with gear teeth, at least one pair of gears which mesh with said gear teeth and which are arranged to be driven in oppositely angular senses, and a common motor for driving each pair of gears to effect simultaneous pivotal movement of all the flaps, whereby selectively to reduce and increase the cross sectional area at the throat of the nozzle.

5. A nozzle as claimed in claim 2 in which alternate flaps are provided with two said links, the remaining flaps being contacted by the said alternate flaps so as to be moved thereby.

6. A nozzle as claimed in claim 2 in which there are two annular rotatable members which are rotated by a plurality of angularly spaced apart motors.

7. A jet engine provided with a jet engine nozzle comprising a nozzle casing, an annular assembly of angularly spaced apart flaps disposed within the nozzle casing, each flap being pivotally connected at its upstream end to the nozzle casing, at least one pair of similar, adjacent, concentric annular rotatable members which are faced by the radially outer faces of the flaps, pairs of similar links for at least some of the flaps, the links of each pair being pivotally connected to their flap at at least one point remote from the nozzle casing and being respectively pivotally connected to the two different rotatable members of a said pair thereof, the rotatable members of each said pair thereof being formed with gear teeth, at least one pair of gears which mesh with said gear teeth and which are arranged to be driven in oppositely angular senses, and a common motor for driving each pair of gears to effect simultaneous pivotal movement of all the flaps, whereby selectively to reduce and increase the cross sectional area at the throat of the nozzle.

References Cited by the Examiner

UNITED STATES PATENTS

| 2,780,056 | 2/1957 | Colley | 239—265.41 |
| 2,932,163 | 4/1960 | Hyde | 239—265.41 |
| 2,989,845 | 6/1961 | Howold | 239—265.41 |

EVERETT W. KIRBY, *Primary Examiner.*